(12) United States Patent
Bachner

(10) Patent No.: US 6,183,216 B1
(45) Date of Patent: Feb. 6, 2001

(54) ARRANGEMENT FOR LONG-DISTANCE CONVEYING OF THICK MATTER

(75) Inventor: Ernst Bachner, Munich (DE)

(73) Assignee: Putzmeister AG (DE)

( * ) Notice: Under 35 U.S.C. 154(b), the term of this patent shall be extended for 0 days.

(21) Appl. No.: 09/230,145

(22) PCT Filed: Aug. 8, 1997

(86) PCT No.: PCT/EP97/04314

§ 371 Date: Jan. 19, 1999

§ 102(e) Date: Jan. 19, 1999

(87) PCT Pub. No.: WO98/15482

PCT Pub. Date: Apr. 16, 1998

(30) Foreign Application Priority Data

Oct. 8, 1996 (DE) .............................................. 196 41 174

(51) Int. Cl.[7] .................................................. F04B 17/00
(52) U.S. Cl. ......................... 417/392; 417/900; 417/279
(58) Field of Search .................................. 417/279, 390, 417/392, 900

(56) References Cited

U.S. PATENT DOCUMENTS

| | | | |
|---|---|---|---|
| 2,953,158 | * 9/1960 | Shea et al. | 137/268 |
| 3,938,912 | * 2/1976 | Sakamoto et al. | 417/339 |
| 4,371,294 | * 2/1983 | Sakamoto | 406/109 |
| 4,714,888 | * 12/1987 | French et al. | 324/326 |
| 5,318,408 | * 6/1994 | Davidsson | 417/53 |
| 5,522,264 | * 6/1996 | Smith et al. | 73/610 |

* cited by examiner

Primary Examiner—Timothy S. Thorpe
Assistant Examiner—Timothy P Solak
(74) Attorney, Agent, or Firm—Pendorf & Cutliff

(57) ABSTRACT

The invention concerns an arrangement for conveying thick matter, in particular liquid concrete. The arrangement comprises a pump (12) which is to be charged on the input side with thick matter to be conveyed, and a distributor (10) which can be connected via a high-pressure feed line (20) to the pressure joint (30) of the pump (12) and preferably takes the form of a tunnel shuttering distributor. The high-pressure feed line (20) is connected both on the pump side and the distributor side to a pipe-switching device (22, 24) which can in each case be switched alternatively between two connections (26, 32, 40, 44). The pump-side pipe-switching device (22) is connected at its one connection (26) to the pressure joint (30) of the pump (12) and at its other connection (32) to the pressure joint (36) of a pressure medium pump (16) which can be acted upon by low-viscosity pressure medium via a reservoir (18). The distributor-side pipe-switching device (24) is connected by one of its connections (40) to the distributor (10) an by its other connection (44) via a return line (45) to the reservoir (18) of the pressure medium pump (16). In order to prevent the distributor side form being acted upon erroneously, the distributor-side pipe-switching device (24) can be switched over as a function of a change of material occurring in the in-coming flow and conveyed material.

11 Claims, 1 Drawing Sheet

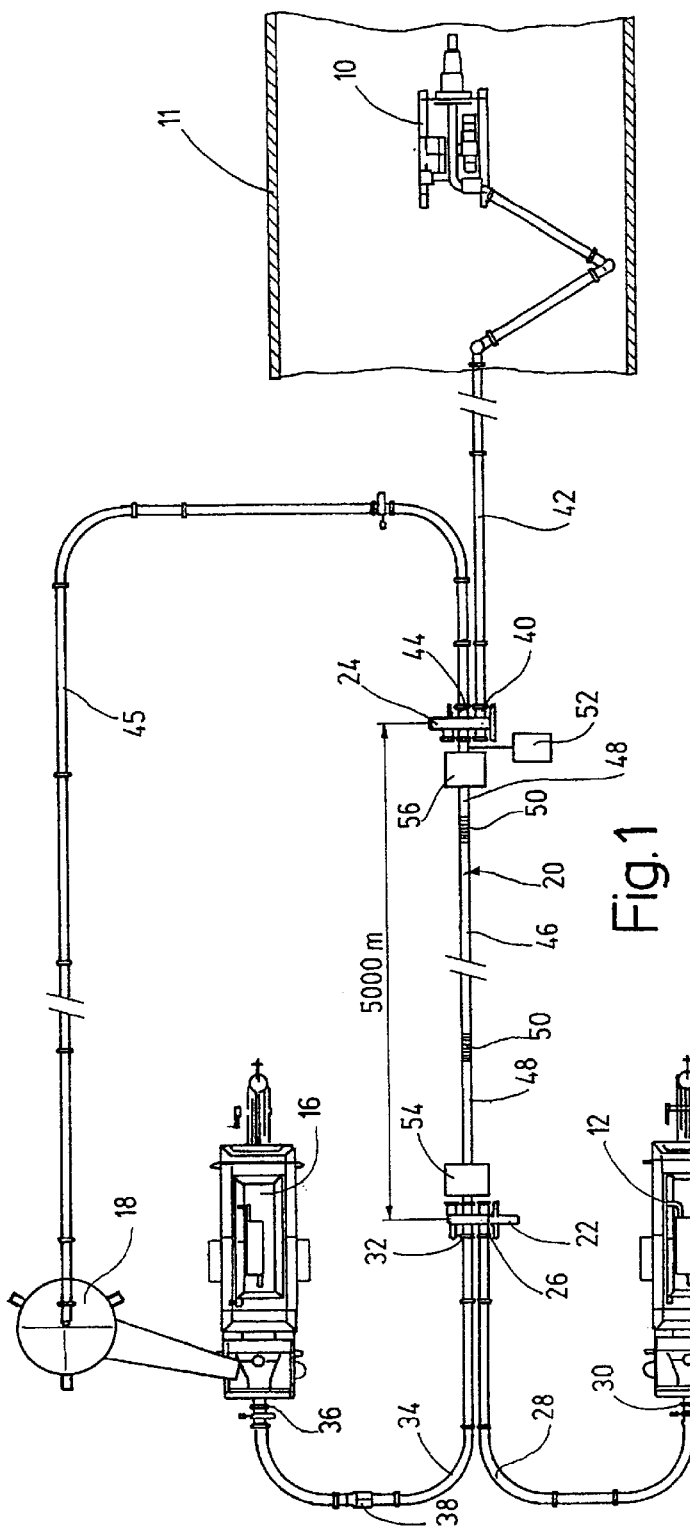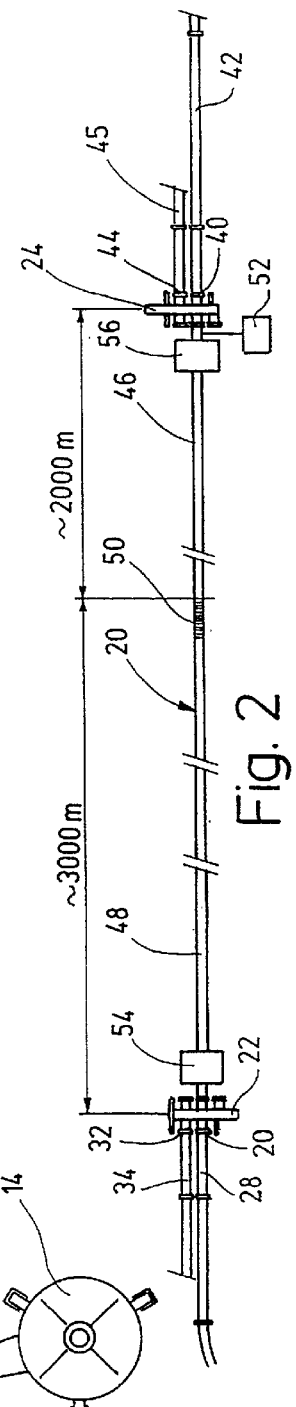

ARRANGEMENT FOR LONG-DISTANCE CONVEYING OF THICK MATTER

BACKGROUND OF THE INVENTION

The invention is related to an arrangement for long-distance conveying of thick matter, in particular liquid concrete, comprising a thick matter pump and a thick matter distributor which is adapted to be coupled to a pressure joint of the thick matter pump by way of a high pressure feed line.

DESCRIPTION OF THE RELATED ART

In the conveying of thick matter over great distances, tight limits are set in dependency on the viscosity of the thick matter and its friction with the wall of the high pressure feed line. In order to increase the attainable conveying distance, it has been proposed (EP-B 0 633 863) to reduce the friction by injecting a lubricant into the region between the wall of the feed line and a length of thick matter formed in and transported along the feed line. This method may be applied especially when conveying thick matter containing a high fraction of solids and when conveying distances of some hundred meters are to be attained. With thick matter containing a high liquid fraction, such as liquid concrete, it is sought to achieve conveying distances of some thousand meters, for instance in tunnel construction work, which cannot be achieved with the known lubricant injection.

SUMMARY OF THE INVENTION

Based on this, it is the object of the invention to develop an arrangement of the type described above for long-distance conveying of thick matter, in particular of liquid concrete, which makes it possible to significantly increase the attainable conveying distance for a given pumping capacity.

The solution according to the invention is based foremost on the idea to reduce the pressure decline along the high pressure feed line by charging only a fraction of the total length of the high pressure feed line with the thick matter to be conveyed, while the remaining length, which may be longer than the charged length, is charged with a pressure medium having a low viscosity and little friction with respect to the feed line wall. In order to achieve this it is proposed according to the invention that the high pressure feed line is connected to a pipe-switching device on the pump side as well as on the distributor side, each of which pipe switching devices is adapted to be alternatingly switched to two connections, wherein the pipe switching device on the pump side is connected to the pressure joint of the thick matter pump with its one connection, and at its other connection to the pressure joint of a thick matter pump which is adapted to be charged with a low-viscosity pressure medium by way of a reservoir, wherein the pipe-switching device at the distributor side is connected at its one connection to the thick matter distributor and at its other connection to the reservoir of the pressure medium pump by way of a return feed line, and wherein the pipe-switching device on the distributor side is adapted to be switched in response to a material change from thick matter to pressure medium or from pressure medium to thick matter occurring in the incoming material flow. Expediently, a sensor which responds to a material change in the material flow and activates the switching operation of the pipe-switching device on the distributor side is provided therefore.

During the steady-state operation of the conveying arrangement it is of advantage when the pipe-switching device on the pump side is adapted to be switched as a function of, preferably synchronous to, the pipe-switching device on the distributor side. In this case it is achieved that always the same amount of thick matter and the same amount of pressure medium are present along the length of the conveying distance and that an approximately constant pressure decline occurrs for a given consistency of the thick matter.

In order to avoid a mixing of the thick matter to be conveyed and the pressure medium in the region of the separation point and to be able to better sense an occurrance of material change, it is proposed according to a preferred embodiment of the invention that a pig trap is connected to the high pressure feed line in the region of the pipe switching device on the pump side, by way of which pig trap at least one partitioning member which is adapted to the cross section of the high pressure feed line is introduced into the high pressure feed line at each switching of the pipe switching device on the pump side. On the other hand the high pressure feed line in the region of the pipe switching device on the distributor side or the return feed line in the region of the reservoir may comprise a pig trap for extracting the incoming partitioning members. In order to be able to switch the the pipe switching device on the distributor side always at the correct instance, it is of advantage when a sensor which responds to an arriving partitioning member and which initiates the switching operation is disposed in the region of the corresponding pipe switching device. The sensor is for example designed to be a magnetic or ultrasonic sensor which responds to the presence of a partitioning member in the high pressure feed line.

Especially during the start-up phase and while conveying thick matter of varying consistency it has proven to be of advantage to provide a sensor for initiating the switching of the pipe switching device on the pump side, which sensor responds to a defined feed pressure of the thick matter pump or a defined pressure decline in the high pressure feed line. With such a measure it is possible to operate the conveying arrangement, for a given conveying capacity, always at an optimum thick matter conveying amount. In order to avoid operating failures, it is important that a backflow prevention device is disposed in the feed line leading from the pressure medium pump to the pipe switching device on the pump side.

The long-distance conveying arrangement according to the invention is expediently used in tunnel construction work. In this case the thick matter distributor may be desigend to be a tunnel shuttering distributor.

In the instance of liquid concrete being the thick matter to be conveyed, water or a concrete-water-mixture or a low-viscosity liquid polymer is used as a pressure medium.

In the following the invention is further described with reference to an embodiment schematically shown in the drawing, in which:

BRIEF DESCRIPTION OF DRAWINGS

FIG. 1 shows a schematic diagram of a conveying arrangement for liquid concrete for tunnel construction work;

FIG. 2 shows a detail of the arrangement according to FIG. 1, the pipe switching devices being switched with respect to FIG. 1.

DETAILED DESCRIPTION OF THE INVENTION

The stationary pumping arrangement schematically shown in the drawing is intended to be used to convey concrete over a long distance to a tunnel shuttering distributor 10 located in a tunnel 11. It consists essentially of a thick matter pump 12 which is preferably designed to be a two-cylinder piston pump and which is charged with liquid concrete from a large material supply container 14, a pressure medium pump 16 which is designed to be a two-cylinder piston pump and which is charged with a pressure medium, for example a bentonite-water mixture, from a large reservoir 18, an approximately 5000 meters long high pressure feed line 20 which extends between the two stationary pumps 12, 16 on the one hand and the tunnel shuttering distributor 10 on the other hand, and two pipe switching devices 22, 24, one of which is connected to the pump side end and the other one of which is connected to the distributor side end of the high pressure feed line 20 and which are adapted to be switched between two connections. The pipe switching device 22 on the pump side is connected with its one connection 26 to the pressure joint 30 of the thick matter pump 12 by way of a feed line 28, while the second connection 32 of the pipe switching device 22 is connected to the pressure joint 36 of the pressure medium pump 16 by way of a feed line 34. For safety reasons a backflow prevention device 38 is disposed in the feed line 34, which permits flow from the pressure medium pump 16 to the pipe switching device 22 and prevents flow in the opposite direction.

The pipe switching device 24 on the distributor side is connected to the tunnel shuttering distributor 10 with its one connection 40 by way of a concrete feed line 42, while it is connected to the reservoir 18 by way of a return feed line 45 for the bentonite-water mixture. In the position shown in FIG. 1, the high pressure feed line 20 communicates by way of the pipe switching device 22 with the pressure medium pump 16 and by way of the pipe switching device 24 with the reservoir 18, while in the position shown in FIG. 2, the high pressure feed line 20 is connected by way of the pipe switching device 22 with the thick matter pump 12 and by way of the pipe switching device 24 with the tunnel shuttering distributor 10. By suitably controlling the pipe switching device 22 it is possible to alternately charge the high pressure feed line 20 with concrete and the pressure medium. In the embodiment shown in FIG. 2, liquid concrete is present in a feed line section 46 having a length of approximately 2000 meters and pressure medium is present in the feed line section 48 having a length of 3000 meters. At the seperation point between the concrete and the pressure medium there is a partitioning member 50 designed to be a pig, which prevents a mixing of concrete and pressure medium and which is easily detected from the outside in order to effect a switching of the pipe switching device 24 on the distributor side. In order to facilitate the latter, the partitioning member 50 can be fitted with a magnetic or magnetizable material which can be detected by a magnetic sensor 52 located in the vicinity of the pipe switching device 24 on the distributor side and which can be used to trigger a switching signal.

The partitioning members 50 are expediently brought into the high pressure feed line 20 during each switching of the pipe switching device 22 by way of a pig trap 54 and are extracted from the high pressure feed line 20 during the switching of the pipe switching device 24 on the distributor side by way of a pig trap 56. In principle it is also possible to dispose the pig trap 56 in the region of the reservoir 18 instead of at the pipe switching device 24. In this case the partitioning member 50 is transported back to the pump side by way of the return feed line 45.

In summary the following is to be stated: The invention is related to an arrangement for long-distance conveying of thick matter, in particular of liquid concrete. The arrangement comprises a thick matter pump 12, the input of which is adapted to be charged with the thick matter to be conveyed, and a thick matter distributor 10 which is adapted to be coupled to a pressure joint 30 of the thick matter pump 12 by way of a high pressure feed line 20 and which is preferably designed to be a tunnel shuttering distributor. The high pressure feed line 20 is connected to a pipe-switching device 22, 24 on the pump side as well as on the distributor side, each of which pipe switching devices is adapted to be alternatingly switched to two connections 26, 32, 40, 44. In this, the pipe switching device 22 on the pump side is connected to the pressure joint 30 of the thick matter pump 12 with its one connection 26, and at its other connection 32 to the pressure joint 36 of a thick matter pump 16 which is adapted to be charged with a low-viscosity pressure medium by way of a reservoir 18. On the other hand, the pipe-switching device 24 at the distributor side is connected at its one connection 40 to the thick matter distributor 10 and at its other connection 44 to the reservoir 18 of the pressure medium pump 16 by way of a return feed line 45. In order to prevent a mischarging on the distributor side, the pipe-switching device 24 on the distributor side is adapted to be switched in response to a material change occurring in the incoming material flow.

What is claimed is:

1. An arrangement for long-distance conveying of thick matter, comprising:

a thick matter pump (12), the input of which is adapted to be charged with the thick matter to be conveyed, the output of which is connected via a connection (26) to the thick matter input of a first pipe switching device (22), a pressure medium pump (16) which is adapted to be charged with a low-viscosity pressure medium by way of a reservoir (18), the output of which is connected via a connection (32) to the pressure medium input of said first pipe switching device (22), a single high pressure conveyor line (20), said first pipe switching device connected via said high pressure conveyor line (20) to a second pipe switching device (24), said first pipe switching device adapted to alternatingly connect said high pressure conveyor line (20) to said first pipe switching device thick matter input and to said first pipe switching device pressure medium input;

said second pipe switching device (24) adapted to switching the connection of said high pressure conveyor line (20) alternatingly between two outputs (40, 44), wherein one of said second pipe switching device (24) outputs (40) is connected to a thick matter distributor (10) and the other of said outputs (44) is connected to the reservoir (18) of the pressure medium pump (16) by way of a return feed line (45), and wherein said second pipe-switching device (24) is adapted to being switched in response to a material change occurring in the incoming material flow.

2. The arrangement of claim 1, further including a sensor (52) for sensing a material change in the material flow and sending a signal which activates the switching operation of said second pipe-switching device.

3. The arrangement of claim 2, wherein the sensor (52) is one of (a) a magnetic and (b) an ultrasonic sensor which responds to the presence of a partitioning member (50) in the high pressure conveyor line (20).

4. The arrangement of claim 1, wherein the switching of said first and second pipe-switching devices are synchronized.

5. The arrangement of claim 1, further comprising a pig trap (54) connected to the high pressure conveyor line (20) downstream of the first pipe switching device (22), by way of which pig trap at least one partitioning member (50), which is adapted to the cross section of the high pressure conveyor line, is introduced into the high pressure conveyor line (20) at each switching of the first pipe switching device (22).

6. The arrangement of claim 5, further including a sensor (52) provided upstream of the second switching device (24), which sensor (52) responds to an arriving partitioning member (50) and sends a signal which initiates the switching operation of the second pipe switching device (24).

7. The arrangement of claim 5, wherein one of (a) the high pressure conveyor line (20) upstream of the second pipe switching device (24) and (b) the return feed line (45) upstream of the reservoir (18) comprises a pig trap (56) for extracting the incoming partitioning members (50).

8. The arrangement of claim 1, further comprising a sensor for sensing one of (a) a predetermined feed pressure of the thick matter pump (14) and (b) a predetermined pressure drop in the high pressure conveyor line (20) and, upon so sensing, sending a signal initiating the switching of the first pipe switching device (22).

9. The arrangement of claim 1, wherein a backflow prevention device (38) is disposed between the pressure medium pump (16) and the first pipe switching device (22).

10. The arrangement of claim 1, wherein the thick matter distributor (10) is a tunnel shuttering distributor.

11. The arrangement of claim 1, wherein said thick matter is liquid concrete, and wherein said pressure medium is selected from the group consisting of water, a concrete-water-mixture and a low-viscosity liquid polymer.

* * * * *